United States Patent [19]

Shii et al.

[11] 4,065,594
[45] Dec. 27, 1977

[54] METHOD OF SHAPING ORIENTED MATERIALS OF POLYOLEFIN

[75] Inventors: Hikaru Shii; Eisuke Oda, both of Yokohama, Japan

[73] Assignee: The Furukawa Electric Co. Ltd., Tokyo, Japan

[21] Appl. No.: 470,020

[22] Filed: May 15, 1974

[30] Foreign Application Priority Data

May 21, 1973 Japan .................................. 48-55584

[51] Int. Cl.$^2$ .............................................. B29D 7/14
[52] U.S. Cl. ................................... 428/113; 156/229; 156/306; 264/22; 264/113; 264/171; 264/175; 428/296; 428/910
[58] Field of Search ............... 264/175, 174, 324, 171, 264/113, 258, 22; 428/113, 296, 910; 162/157 R; 156/306, 288, 229

[56] References Cited

U.S. PATENT DOCUMENTS

| | | | |
|---|---|---|---|
| 3,083,410 | 4/1963 | McGlamery | 264/175 |
| 3,380,868 | 4/1968 | Moser | 156/306 |
| 3,405,674 | 10/1968 | Coates et al. | 264/324 |
| 3,502,528 | 3/1920 | Yoshimura | 156/306 |
| 3,540,979 | 11/1970 | Hughes | 156/306 |
| 3,551,271 | 12/1970 | Thomas et al. | 264/171 |
| 3,589,975 | 6/1971 | Andrews et al. | 156/324 |
| 3,823,210 | 7/1974 | Shii et al. | 264/41 |
| 3,837,995 | 9/1974 | Floden | 156/306 |

Primary Examiner—Jeffery R. Thurlow
Attorney, Agent, or Firm—Carroll F. Palmer

[57] ABSTRACT

A method for preparing sheet-like, cord-like and other forms of product having excellent physical and chemical properties by mechanically pressing filmy or fibrous oriented materials of crystalline polyolefin, utilizing the pressure sensitivity of said materials.

15 Claims, 1 Drawing Figure

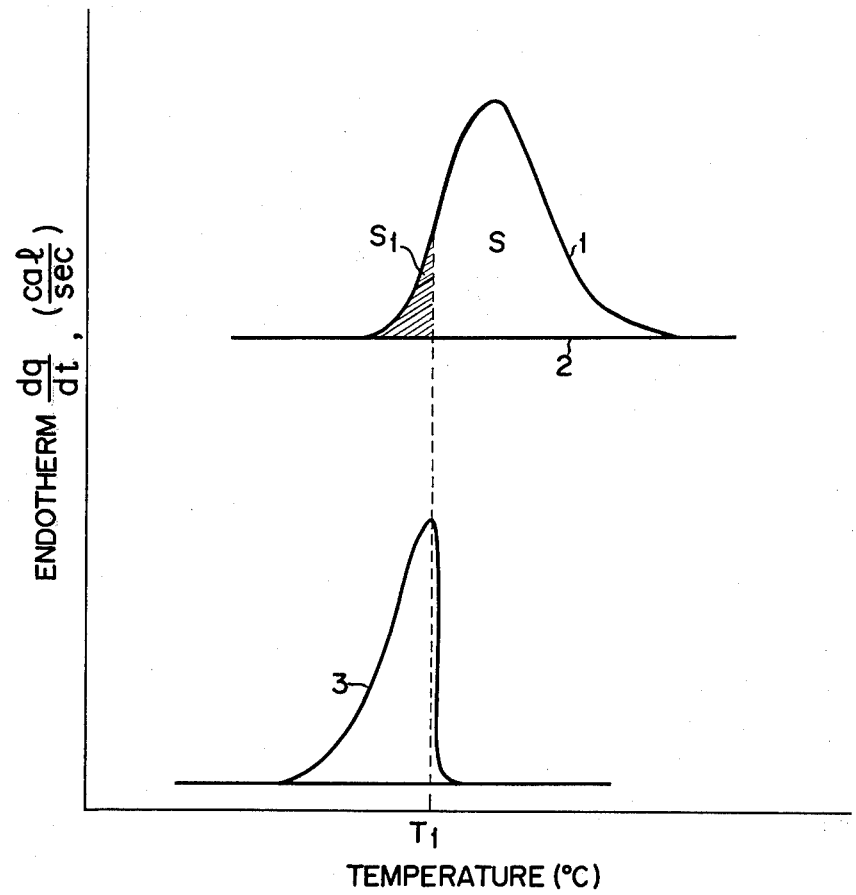

METHOD OF SHAPING ORIENTED MATERIALS OF POLYOLEFIN

This invention relates to a method of preparing sheet-like, cord-like and other forms of polyolefin product having prominent physical and chemical properties and more particularly to a method of providing effective sheets for insulation of oil-filled power cables. Such insulation sheet is generally an oil-impregnated type whose main material is formed of pulp. However, such oil-impregnated insulation sheet which has a relatively large dielectric loss is not adapted for insulation of ultra-high voltage power cables. Recent tendency toward application of ultra-high voltage power cables demands an insulation material having a far less dielectric loss than has been allowed in the past. With ultra-high voltage cables, reduction of transmission loss requires the factors $\epsilon$ and tan $\delta$ of an insulation material to be minimized.

Oil-impregnated insulation paper can be appreciably saved from dielectric loss by deionizing treatment, but under certain limitations. Namely, an attempt to reduce dielectric loss by digesting of pulp necessarily leads to the partial destruction of the cellulosic structure of the pulp and in consequence the fall of mechanical strength of insulation paper, though the factor tan $\delta$ of said insulation paper may be decreased. Therefore, this process is practically undesirable.

From the above-mentioned point of view, an attempt has recently been made to use a synthetic fiber insulation sheet mainly formed of polyolefin and indicating an extremely small value of tan $\delta$. However, polyolefin fiber raises problems not only with resistance to heat and oil demanded of such type of insulation material but also with the fabricating processes. A polyolefin fiber sheet is generally prepared by forming hot-drawn and fibrillated polyolefin fibers into a sheet by applying adhesive or by fusing said fibers under heat and pressure utilizing the thermal fusibility thereof. However, application of adhesive not only complicates the forming process and reduces the resistance to heat and oil and the electric properties of the adhesive used, though a good fibrous insulation sheet may be obtained, but also fails to improve the resistance to heat and oil of raw polyolefin itself. On the other hand, in the case of thermal fusion of polyolefin fibers, a high degree of thermal stretching of raw fibers causes thermal shrinkage during fabrication under heat and pressure and loss of dimensional stability, failing to provide a desired product. Though thermal fusion under high pressure may eliminate noticeable thermal shrinkage, a product obtained can not be released from pressure until it is fully cooled, with the resultant fall of productivity. Moreover, a product thus prepared generally takes the form of solid film presenting too large oil flow resistance to be used as insulation material for oil-filled power cables.

Increase of the molecular weight or cross linking of polyolefin can indeed somewhat improve resistance to heat and oil but decreases the workability of polyolefin.

It is accordingly the object of this invention to provide a method of preparing an insulation material free from the defects of prior art product simply by applying mechanical pressure, without using any adhesive or thermal fusion.

The present inventors have studied the relationship between the fine structure and the physical properties of crystalline polyolefin and discovered that oriented materials of polyolefin having the later described particular fine structure have pressure sensitivity. This invention has been accomplished by said discovery to provide a method of preparing insulation material firmly formed into an integral mass simply by applying mechanical pressure.

The appended drawing presents the melting curve of polyolefin as measured by differential scanning calorimeter (hereinafter abbreviated as "DSC"), showing the melting behavior of oriented materials of polyolefin used in the method of this invention.

The raw oriented materials of polyolefin used in the method of this invention should meet the following three requirements:

a. The oriented material presents a prominent superheated state when thermally melted. In other words, "K" (explained below) determined from the melting curve obtained by DSC is smaller than 70% or preferably 60%.

b. The value of the long period "L" determined from the scattering intensity curve obtained by measuring small angle X-ray scattering is larger than 350 A, or preferably 500 A.

c. The oriented material has a higher crystallinity "C" than 70% or preferably 80%.

It should be noted that the values of K, L and C are determined by the following processes respectively:

K: The melting curve of the oriented materials of crystalline polyolefin used in the present invention determined by DSC shows a form indicated by 1 in FIG. 1. When measured again after cooling the sample, the melting curve presents a form indicated by 3. A base line 2 is drawn below the curve 1 and an area defined by the curve 1 and the base line 2 is designated as S. A temperature represented by the peak point of the curve 3 is indicated by $T_1$. That portion of the above-mentioned area S which corresponds to a lower temperature than $T_1$ is denoted by $S_1$. Then K is expressed by the following equation:

$$K = S_1/S \times 100$$

Determination by DSC was carried out under the condition in which samples weighing 3 to 10mg were tested with the heating rate set at 5 to 15 ° C/min.

L: The long period L is calculated by applying the Bragg's equation to the peak point of the scattering intensity curve obtained by measuring small angle X-ray scattering. This measurement was carried out under the following conditions:

X-ray source: Roterflex RU-3 made by Rigaku Denki Co., Ltd.
Target: Copper
Tube voltage: 50 KV
Tube current: 80 mA
Focus: Point focus
Filter: Ni
Small angle X-ray scattering apparatus: Manufactured by Rigaku Denki Co., Ltd.
1st slit: 0.1 × 11
2nd slit: 0.05 × 11
Counting slits: 0.1 × 11 and 0.02 × 15
Scanning rate: 4'/min
Counter: Proportional counter
Measuring Temperature: Room temperature C: The density of the oriented materials of polyolefin used in the present invention is measured at 30° C using a density gradient tube. The crystallinity of said materials is calculated by the following equation:

$$1/\rho = (1 - \omega^c)/\rho_a + \omega^c/\rho_c$$

where:

$\rho_a$ = density of amorphous region of the polyolefin
$\rho_c$ = density of crystalline region of the same
$\omega^c$ = crystallinity
$\rho$ = density being measured As mentioned above, the first requirement of the oriented materials of polyolefin used in the method of this invention is that K is smaller than 70%. However, the formability of the oriented materials into integral mass is not merely governed by K but by L and C as well. In case L is smaller than 350 A even when K is smaller than 70% or in case C is smaller than 70% even when K is smaller than 70% and L is larger than 350 A, the oriented materials will not be made into integrated mass at a lower level than the thermal distortion temperature and not have prominent resistance to heat and oil.

After all, the oriented materials of polyolefin which meet the above-mentioned requirements for K, L and C at the same time can be made adaptable for use in the method of this invention.

Accordingly, the raw films or fibers that meet the above three requirements, used in the method of this invention are prepared from crystalline polyolefin such as polyethylene, isotactic polypropylene, polybutene-1 and poly-4-methyl-pentene-1. As used herein, the term "oriented materials of polyolefin" includes split-yarns obtained from films, monofilaments, and fibers prepared by cutting said monofilaments or split-yarns into short pieces.

The above-mentioned oriented materials of polyolefin are easily provided by the present inventors' process set forth in their U.S. Pat. No. 3,823,210. Said process consists of first forming polyolefin film by extrusion, drawing said film to a considerable extent in the direction of extrusion at as low temperature as possible, applying a tensile stress to a uniaxially stretched film thus obtained and, under this condition, extracting soluble fractions from said film in a solvent for polyolefin at a temperature close to the dissolution temperature.

The raw oriented materials of polyolefin according to this invention are characterized in that they can be easily made into a desired integral product simply by applying mechanical pressure without adhesive or heat as is the case with the prior art in which highly oriented materials are made by hot drawing. Accordingly, the product of this invention truthfully displays the properties of the raw oriented materials of polyolefin, namely, prominent resistance to oil and heat, high dimensional stability and excellent electrical properties.

The oriented materials of polyolefin according to this invention are characterized in that the small-angle X-ray scattering pattern presents discrete scattering on the meridium arising from an extremely large value of long period L and also intense diffuse scattering on the equator due to fibrillation of the oriented materials. Referring to the latter type of scattering, the intensity of diffuse scattering at an angle corresponding to the peak intensity on the meridium (namely, a vertical direction of the pattern) and at the same angle on the equator (namely, in a horizontal direction of the pattern) is 60 to 120% of the intensity of discrete diffraction.

The oriented materials of polyolefin usable in the method of this invention have a tensile strength generally ranging from 5 to 10 (g/d), or about twice that of the prior art polyolefin films or fibers. K determined by DSC makes little difference whether before or after the mechanical pressure is applied according to the method of this invention. This holds true with C. However, L after application of mechanical pressure often cannot be observed between the fine structure is changed by the pressure.

The above-mentioned mechanical pressure is applied by pressing a mass of raw oriented films or fibers made into a desired form against the surface of, for example, metal material. When a sheet-like product is manufactured, the raw oriented materials are superposed in the direction of orientation, arranged in parallel or at right angles to each other or at random, and thereafter subjected to rolling or press work, for example, on rolls used in ordinary metal work or emboss rolls. When a cord-like product is formed, the raw oriented materials are aligned in the direction of orientation and squeezed through a drawing die.

If the pressing surface of, for example, rolls is fitted or coated with buffer material such as, cloth, paper, rubber, plastic sheet or film, then uniform pressure can be applied to the work, thus offering advantage in preparing a sheet-like product.

Mechanical pressure applied in manufacturing the product of this invention is generally chosen to range between 50 and 1000 kg/cm$^2$ or preferably between 500 and 800 kg/cm$^2$.

When a mechanical pressure is applied within the above specified range, the rate of reduction in the thickness or diameter of the shaped materials falls within the range of 5 to 50%. The apparent density of the product of this invention thus prepared ranges in almost all cases between the density of crystalline region of polyolefin and 40% of the density of the amorphous region thereof. Said apparent density falls within the range of 0.342 to 1.00 for high density polyethylene, 0.340 to 0.938 for isotactic polypropylene, 0.348 to 0.95 for polybutene-1 and 0.335 to 0.813 for poly-4-methylpentene-1.

Though mechanical pressure according to the method of this invention is generally applied at room temperature, it is advised to apply such level of temperature as does not give rise to the thermal shrinkage of the raw oriented materials of polyolefin, namely, a temperature higher than the temperature at which glass transition takes place and lower than the temperature at which thermal distortion arises. The reason is that a higher temperature at which thermal distortion arises causes change in K, L and C of the oriented materials of polyolefin due to thermal shrinkage thereof and prevents said oriented materials from being formed into an integral body even when mechanically pressed, and that a lower temperature at which glass transition takes place renders the raw oriented materials brittle and results in the occurrence of cracks in a product obtained. Therefore, preferred temperature for application of the above-mentioned mechanical pressure ranges between 20° and 80° C for high density polyethylene, 20° and 90° C for isotactic polypropylene, 20° and 90° C for polybutene-1, and 20° and 160° C for poly-4-methyl-pentene-1.

When the raw oriented materials of this invention consisting of ordinary polyolefin fibers are further blended with, for example, pulp in an amount of not more than 50% by weight, then a mixed paper-like sheet is provided. It is also possible to mix a small amount of inorganic powder or any other material with the subject raw oriented materials.

Cross-linking obviously elevates the physical and chemical properties of the product of this invention as in the prior-art polyolefin products. This cross-linking may be effected either by a chemical process using known organic peroxides or by ionizing radiation. However, the latter radiation cross-linking process is more preferred to maintain the dimensional stability of a product obtained.

Products prepared by application of the method of this invention include not only sheets, cords, ropes or other elongate articles but also useful industrial materials such as electric insulation material, wrapping paper for heavy objects, writing or printing paper.

The method of this invention will be better understood by reference to the examples which follow, though this invention is not limited thereto.

EXAMPLE 1

Film samples prepared from high density polyethylene having a melt index of 0.38 by inflation method in blow ratio of 1, and take-up rate of 600 cm/min were drawn 10 times longer in the machine direction while being brought into contact with a hot plate at 80° C. The samples thus drawn were immersed for about 40 seconds under a tensile force of 30 kg/cm$^2$ in a bath of commercial xylene maintained at dissolution temperature range. After extraction and drying, the samples turned into translucent filmy oriented materials of polyethylene, 12 microns thick. These oriented samples had K, L and C values set forth in the column (a) of Table 1 below. Six strips of the oriented films were laid one on top of another intersected alternately at right angles to each other in the direction of orientation. The superposed mass was placed between two pieces of analytical filter paper, 250 microns-thick and rolled into a translucent sheet, 40 to 70 microns-thick, under the conditions shown in the column (b) of Table 1.

Various sheet-like samples each consisting of six superposed oriented films had the properties shown in the column (c) of Table 1. The apparent density of each sample shown in the column (c) was determined by pycnometer in the water at 30° C. The values of oil resistance indicated in said column (c) were obtained by immersing each sample for three hours in insulation oil of dodecyl benzene at 110° C, expressed in percentage of the weight of the nondissolved portion of the lot against its original weight. The value of tan δ was measured by 50 Hz alternating current of 15 KV/mm, while each sheet-like sample was immersed in said insulation oil of dodecyl benzene at 80° C. The tensile strength was shown in the break strength (kg/15 mm width) when a 15 mm-wide and 100 mm-long piece cut out of each sample was drawn at the rate of 30%/min. The heat resistance was expressed in the temperature at which thermal shrinkage began to take place in each sample heated in silicone oil at a constant rate of 5° C/min. The peel strength was expressed in a sufficient load to cause a 15 mm-wide piece cut out of each sample to be stripped off.

The value of oil flow resistance was obtained by measuring the amount of oil (dodecyl benzene) passing between each layer of 10 pieces of doughnut-shaped sample laid one on top of another after immersion in 100° C dodecyl benzene oil for 10 days and estimated from the following equation:

$$\rho = \frac{980 \times 2\pi \times \Delta\rho \times l}{Q \times \eta \times ln_{D/d}} \text{ (cm}^{-2}\text{)}$$

where:
$\Delta\rho$ = oil pressure (kg/cm$^2$)
D = outer diameter (cm) of doughnut-shaped sample
d = inner diameter (cm) of the sample
$\eta$ = viscosity (centipoises) of oil
l = total thickness (cm) of the laid samples
Q = amount of oil (cm$^3$/second)

Table 1 (PE)

| EXPT. NO. | (a) | | | (b) | | |
|---|---|---|---|---|---|---|
| | K(%) | L(A) | C(%) | Mechanical pressure (kg/cm$^2$) | Rolling temp. (° C) | Reduction rate (%) |
| 1 | 10 | 630 | 90 | 750 | 20 | 30 |
| 2 | 51 | 600 | 88 | 750 | 20 | 30 |
| 3 | 10 | 630 | 90 | 250 | 20 | 10 |
| 4 | 10 | 630 | 90 | 900 | 20 | 40 |
| 5 | 10 | 630 | 90 | 750 | 80 | 30 |
| 6 | 10 | 630 | 90 | 750 | 20 | 30 |
| 7 | 70 | 300 | 70 | 750 | 20 | 30 |
| 8 | 80 | 260 | 64 | 750 | 20 | 30 |
| 9 | 10 | 630 | 90 | 40 | 20 | 3 |
| 10 | 70 | — | 67 | — | c.a. 120< | — |
| 11 | — | — | — | — | — | — |

| EXPT. NO. | (c) | | | | | | |
|---|---|---|---|---|---|---|---|
| | Apparent density | Oil resistance (%) | tan δ | Tensile strength (kg/15 mm wide) | Heat resistance | Peel strength g/15 mm wide) | Oil flow resistance (cm$^{-2}$) |
| 1 | 0.82 | 100 | 0.02 | 6.0 | 115 | 350 | 3×10$^7$ |
| 2 | 0.81 | 100 | 0.02 | 5.8 | 112 | 340 | 3.1×10$^7$ |
| 3 | 0.50 | 100 | 0.02 | 4.6 | 115 | 300 | 3×10$^7$ |
| 4 | 0.90 | 100 | 0.02 | 6.5 | 115 | 360 | 3×10$^7$ |
| 5 | 0.83 | 100 | 0.02 | 6.3 | 115 | 355 | 3×10$^7$ |
| 6 | 0.82 | 100 | 0.02 | 6.0 | 120 | 350 | 2.9×10$^7$ |
| 7 | 0.20 | 70 | 0.02 | 0.8 | 90 | 2 | 1×10$^8$ |
| 8 | 0.80 | 30 | 0.02 | 0 | 90 | 0 | 8×10$^9$ |
| 9 | 0.20 | 100 | 0.02 | 1.2 | 115 | 1.5 | 3×10$^7$ |
| 10 | 0.50 | 40 | 0.02 | 10.0 | 100 | 600* | 7×10$^8$ |
| 11 | 0.72 | 100 | 0.24 | 8 | — | 1200* | 2.5×10$^7$ |

*Breaking strength

The determination of the above-mentioned oil flow resistance was carried out at a temperature of 26° to 29° C.

Experiments 1 to 6 cover the process of the present invention effected under varied conditions. Experiment 6 is the same as Experiment 1 except that gamma-ray of 20 M rad was irradiated. Experiments 7 to 11 were made for comparison.

The sample used in Experiment 7 consisted of superposed oriented films treated in the same manner as in Experiment 1, except that it had a value of L lower than specified in the foregoing for the process of the present invention.

The sample used in Experiment 8 was made of a commercially available uniaxially drawn film.

The sample used in Experiment 9 was the same as the one used in Experiment 1, except that it was rolled with an insufficient force.

The sample used in Experiment 10 relates to a commercially available polyethylene fibrous sheet.

The sample used in Experiment 11 was kraft paper for electrical insulation.

As is evident from Table 1, the product of the invented process has also prominent oil resistance and oil flow resistance and a small value of tan δ.

Namely, the method of this invention can prepare from polyolefin unique insulation material best for ultra-high voltage oil-filled cables. The prior-art raw materials used in the comparative Experiments make it impossible to obtain products capable of meeting the required electric properties, oil resistance and oil flow resistance as fully as the sheet-like materials of polyolefin according to this invention.

EXAMPLE 2

A silver-plated copper wire 0.2 mm in diameter was placed between two pieces of raw oriented film of polyethylene of this invention, 12 microns-thick and 20 mm-wide, and was drawn through a die having an inner diameter of 0.8 mm at the rate of 30 cm/min, providing a wire covered with a transparent coating. This coated wire had a conductor positioned at the center and had a prominent oil resistance. When immersed even for 6 hours in insulation oil of dodecyl benzene at 110° C, the coating neither swelled nor was dissolved. The coating had a tensile strength of 8,000 kg/cm$^2$.

EXAMPLE 3

Film samples of isotactic polypropylene having a melt index of 5.0 were extruded by inflation method, and uniaxially stretched to an extent of 8 times longer in an air thermostat at 120° C. The stretched film samples were subjected to 5-minute extraction in hot xylene with application of a tensile force of 30 kg/cm$^2$, and, when dried at room temperature, changed into highly oriented polypropylene films, 10 microns-thick. Four oriented films were superposed, intersected alternately at right angles to each other in respect to the direction of orientation and drawn through a calender roll in air at 20° C, providing transparent sheets (Experiments 12 and 13). As determined in the same manner as in Example 1, these samples had apparent density, oil resistance, tan δ, tensile strength, heat resistance, peel strength and oil flow resistance all as set forth in the column (c) of Table 2 below.

Table 2 (PP)

| EXPT. NO. | (a) | | | (b) | | |
|---|---|---|---|---|---|---|
| | K(%) | L(A) | C(%) | Mechanical pressure (kg/cm$^2$) | Rolling temp. (° C) | Reduction rate (%) |
| 12 | 20 | 600 | 85 | 750 | 20 | 30 |
| 13 | 20 | 600 | 85 | 250 | 20 | 10 |
| 14 | 80 | 300 | 60 | 750 | 20 | 30 |
| 15 | 90 | 250 | 72 | 750 | 20 | 30 |
| 16 | 75 | — | 70 | — | c.a. 160< | — |

| EXPT. NO. | Apparent density | Oil resistance (%) | tan δ | Tensile strength (kg/15 mm wide) | Heat resistance (° C) | Peel strength (g/15 mm wide) | Oil flow resistance (cm$^{-2}$) |
|---|---|---|---|---|---|---|---|
| 12 | 0.85 | 100 | 0.04 | 6.2 | 120 | 370 | 2.7×10$^7$ |
| 13 | 0.50 | 100 | 0.04 | 3.0 | 120 | 350 | 2.5×10$^7$ |
| 14 | 0.20 | 71 | 0.04 | 0.8 | 105 | 1.5 | 1.5×10$^8$ |
| 15 | 0.78 | 30 | 0.04 | 0 | 106 | 0 | 9×10$^9$ |
| 16 | 0.80 | 80 | 0.04 | 11.3 | 110 | 900* | 2×10$^9$ |

*Breaking strength

In Experiment 14 was used a sample treated in the same manner as in Experiment 12 except that the values of K, L and C were not within the ranges specified for the method of the present invention.

The sample used in Experiment 15 was made of a commercially available inflation film, 20 micron-thick.

In Experiment 16 was used a commercially available polypropylene fiber sheet, 200 micron-thick.

EXAMPLE 4

Film samples were prepared from high-density polyethylene having a melt index of 0.4 by inflation at a die temperature of 230° C and in the blow ratio of 3. Each inflation film was later drawn 15-times longer uniaxially. The film was passed through hot xylene at 112° C under a tensile stress of 40 kg/cm$^2$ applied in the direction of drawing. The film sample thus treated had a thickness of about 10 microns and K, L and C of 10%, 600 A and 85% respectively. The film sample was brought into contact with a needle roll to provide 1 to 10-denier split-yarns. The split-yarns were laminated in the form of a uniform web in air stream, mechanically pressed on a calender roll for metal working, providing a translucent fibrous sheet.

Comparison is given between the physical properties of the polyethylene fiber sheet of this invention and those of the commercially available polyethylene fiber sheet.

Table 3

| | Tensile strength (kg/15 mm width) | | Elongation (%) | | Impulse break down strength (kv/mm) | |
|---|---|---|---|---|---|---|
| | Initial | After heating in oil* | Initial | After heating in oil* | Initial | After heating in oil* |
| Product of this invention | 14.5 | 13.2 | 10.3 | 12.1 | 150 | 142 |
| Commercially available polyethylene fiber sheet | 10.0 | 4.8 | 19.2 | 15.3 | 140 | 100 |

*heated in insulation oil of dodecyl benzene for 100 days at 110° C

EXAMPLE 5

70% by weight of beaten kraft pulp was fully blended with 30% by weight of fibers, 1 to 5 cm long, cut out of polyethylene split-yarns obtained in Example 4, and made into a mixed paper by a conventional paper-making process.

The mixed paper was finished by mechanically pressing on a calender roll operated with a force of 250 kg/cm² at room temperature. Table 4 shows the properties of the mixed paper made by this invention, in comparison with those of the paper made of pulp and prior-art polyethylene fiber mixed at the same ratio.

Table 4

| | Tensile strength (kg/15mm width) | | Elongation (%) | | Impulse break down strength (kv/mm) | | Swelling (%) | Tan δ (% at 80° C) | |
|---|---|---|---|---|---|---|---|---|---|
| | Initial | After heating in oil | Initial | After heating in oil | Initial | After heating in oil | | Initial | After heating in oil |
| Mixed paper of this invention | 12.8 | 12.0 | 5.0 | 4.6 | 145 | 139 | 2 | 0.08 | 0.09 |
| Commercially available mixed paper | 13.0 | 10.5 | 19.0 | 9.3 | 140 | 113 | 15 | 0.03 | 0.10 |

Notes:
(1) Both the mixed paper of this invention and the prior-art mixed paper had a thickness of 125 microns.
(2) The impulse break down was measured in insulation oil (dodecyl benzene).
(3) "Heating in oil" was done for 60 days at 100° C after immersion in insulation oil of dodecyl benzene.
(4) Swelling was expressed by the percentage of increase in volume of the samples.

What we claim is:

1. A method of manufacturing shaped articles of polyolefin oriented materials which comprises:
   providing oriented filmy or fibrous raw polyolefin material satisfying the following requirements:
   a. K determined from a melting curve by differential scanning calorimetry smaller than 60%,
   b. long period L determined from small angle X-ray scattering intensity larger than 500A, and
   c. crystallinity C higher than 80%,
   aggregating said polyolefin material into desired shape, and
   pressing the aggregated material at a pressure of 50 to 1000 kg/cm² at a temperature higher than the glass transition point and lower than the thermal distortion point of said polyolefin material whereby the aggregated material is formed into an integral mass simply by the effect of the applied pressure and without use of adhesive.

2. A method according to claim 1, wherein the oriented materials cross-linked by ionizing radiation are used.

3. A method according to claim 1, wherein the oriented filmy or fibrous raw materials of polyolefin are mixed with less than 50% by weight of cellulose of synthetic fibers.

4. A method according to claim 1, wherein the oriented materials of polyolefin are mechanically pressed with buffer materials placed on the surface of said oriented materials.

5. Shaped polyolefin products formed substantially by the method set forth in claim 1.

6. Shaped polyolefin products according to claim 5, wherein the density of said shaped polyolefin products ranges between the density of the crystalline region of raw polyolefin and 40% of the density of the amorphous region of said raw polyolefin.

7. Shaped polyolefin products formed substantially by the method set forth in claim 3.

8. Shaped polyolefin products according to claim 5 in the form of a sheet having an oil flow resistance lower than $10^8$ cm$^{-2}$.

9. The method of claim 1 wherein said raw polyolefin material is in the form of thin webs, said webs are aggregated by laying a plurality upon one another and the product resulting from the method is an integral sheet of polyolefin material.

10. The method of claim 9 wherein said thin webs are positioned in said aggregation at different angles to each other relative to their axis of orientation.

11. The method of claim 1 wherein the product resulting from the method is a translucent sheet of polyolefin material about 40 to 70 microns thick.

12. The method of claim 1 wherein said pressure is between about 500 and 800 Kg/cm².

13. A method of manufacturing insulation sheeting consisting of polyolefin which comprises:
   providing oriented polyolefin film satisfying the following requirements:
   a. K determined from a melting curve by differential scanning calorimetry smaller than 60%,
   b. long period L determined from small angle X-ray scattering intensity larger than 500 A, and
   c. crystallinity C higher than 80%,
   superposing a plurality of said films upon one another, and
   pressing the superposed films at a pressure between about 50 and 1000 Kg/cm² at a temperature higher than the glass transition point and lower than the thermal distortion point of the polyolefin of which the film is formed whereby the superposed films are transformed into integral insulation sheeting simply by the effect of the applied pressure and without use of adhesive.

14. The method of claim 13 wherein said films are positioned in said superposed arrangement at different angles to each other relative to their axis of orientation.

15. A translucent polyolefin sheet having an oil flow resistance lower than $10^8$ cm$^{-2}$ prepared by the method of claim 13.